US010867428B2

United States Patent
Ceylan et al.

(10) Patent No.: US 10,867,428 B2
(45) Date of Patent: *Dec. 15, 2020

(54) ENHANCED TEXTURE PACKING

(71) Applicant: ADOBE INC., San Jose, CA (US)

(72) Inventors: Duygu Ceylan, Mountain View, CA (US); Nathan Aaron Carr, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,938

(22) Filed: Feb. 12, 2019

(65) Prior Publication Data

US 2019/0180495 A1    Jun. 13, 2019

Related U.S. Application Data

(63) Continuation of application No. 15/263,171, filed on Sep. 12, 2016, now Pat. No. 10,229,525.

(51) Int. Cl.
G06T 15/04 (2011.01)
G06T 11/00 (2006.01)

(52) U.S. Cl.
CPC ............ *G06T 15/04* (2013.01); *G06T 11/001* (2013.01); *G06T 2210/12* (2013.01)

(58) Field of Classification Search
CPC ............................. G06T 15/04; G06T 11/001
See application file for complete search history.

(56) References Cited

U.S. PATENT DOCUMENTS 7,605,820 B1   10/2009  Rogers et al.
10,229,525 B2 *  3/2019  Ceylan ............... G06T 11/001
2017/0278293 A1  9/2017  Hsu
2018/0012407 A1  1/2018  Chuang et al.

OTHER PUBLICATIONS

J. Martinez and C. Andujar, "Space-Optimized Texture Atlases for 3D Scenes with Per-polygon Textures," 2010 18th Pacific Conference on Computer Graphics and Applications, Hangzhou, 2010, pp. 14-23. doi: 10.1109/PacificGraphics.2010.10.

(Continued)

*Primary Examiner* — Antonio A Caschera
(74) *Attorney, Agent, or Firm* — Shook, Hardy & Bacon L.L.P.

(57) ABSTRACT

Embodiments of the present invention are directed towards compactly incorporating texture charts into a texture atlas. Texture charts represent three-dimensional mesh segments flattened into two-dimensional shapes. In one embodiment, a texture atlas generating engine is used to generate and evaluate compactness scores of candidate placements for a texture chart. Candidate placements generally refer to the possible locations where a texture chart can be incorporated into a texture atlas. The compactness score can be based on minimizing the distance between a texture chart being incorporated into the texture atlas and the center of mass of previously incorporated texture charts within a texture atlas. In embodiments, an infinity norm can be utilized to compute such a compactness score by outputting an average length of vectors between a texture chart being incorporated into a texture atlas and the texture atlas. Other embodiments may be described and/or claimed.

20 Claims, 8 Drawing Sheets

(56) References Cited

OTHER PUBLICATIONS

Lévy, B., Petitjean, S., Ray, N., & Maillot, J. (Jul. 2002). Least squares conformal maps for automatic texture atlas generation. In ACM transactions on graphics (TOG) (vol. 21, No. 3, pp. 362-371 ). ACM.

Nöll, T. and Strieker, D. (2011 ), Efficient Packing of Arbitrary Shaped Charts for Automatic Texture Atlas Generation. Computer Graphics Forum, 30: 1309-1317. doi: 10.1111/j.1467-8659.2011.01990.x.

Sander, P. V., Snyder, J., Gertler, S. J., & Hoppe, H. (Aug. 2001). Texture mapping progressive meshes. In Proceedings of the 28th annual conference on Computer graphics and interactive techniques (pp. 409-416). ACM.

Sander, P. V., Wood, Z., Gertler, S. J., Snyder, J., & Hoppe, H. (2003). Multi-Chart Geometry Images. In Proceedings of Eurographics/ACM SIGGRAPH Symposium on Geometry processing, Aachen, Germany.

Zhou, K., Synder, J., Guo, B., & Shum, H. Y. (Jul. 2004). Iso-charts: stretch-driven mesh parameterization using spectral analysis. In Proceedings of the 2004 Eurographics/ACM SIGGRAPH symposium on Geometry processing (pp. 45-54). ACM.

\* cited by examiner

ENHANCED TEXTURE PACKING

CROSS-REFERENCE TO RELATED APPLICATIONS

This application is a continuation of and claims priority from U.S. application Ser. No. 15/263,171, filed Sep. 12, 2016, entitled "ENHANCED TEXTURE PACKING," the entire contents of each application being herein incorporated by reference.

BACKGROUND

Texture mapping generally refers to mapping information onto a surface of a three-dimensional mesh (i.e., collection of vertices, edges, and faces defining a shape of a three-dimensional object in computer graphics). Texture mapping is typically used in computer graphics to assign information, such as coloring, patterning, and/or lighting, to the surface of a three-dimensional mesh. Preparing a mesh for texture mapping is typically performed in two stages. The first stage is parameterization where a mesh is divided into segments that can be unfolded into the two-dimensional domain with minimal distortion. Thus, this first stage results in a mesh being split into one or more mesh segments. Such mesh segments are three-dimensional portions of the overall mesh; these three-dimensional mesh segments can be flattened into two-dimensional shapes known as texture charts. The second stage is then individually parameterizing the two-dimensional texture charts.

During the second stage parameterization, an important step is placing and orienting the texture charts into a texture atlas as compactly as possible. A texture atlas is a large image containing a collection, or "atlas," of sub-images, where the sub-images are texture charts of some portion of a three-dimensional mesh. A texture atlas most commonly covers a square or rectangular domain which corresponds to locations in a rectangular pixel image. This allows pixel data to be conveniently stored in memory, while also leveraging commonly used formats such as JPEG, PNG or GIF. The mapping or atlas describes how this two-dimensional image of pixel information appears on the surface of the three-dimensional shape.

Currently, to pack texture charts into a texture atlas, one approach approximates each two-dimensional texture chart utilizing a rectangular bounding box. The rectangular bounding boxes are then packed into a texture atlas. However, this approach does not take into account that texture charts often have arbitrary shapes. As such, representing texture charts with a bounding box can result in wasting unused space thereby creating a larger than necessary texture atlas. Other approaches use Euclidean distance, or straight-line distance, minimization between the boundary of a newly incorporated texture chart and the boundary of texture charts previously incorporated into a texture atlas as a primary criterion for placing a texture chart. For example, in one method, texture charts are placed using a minimum distance between the bottom boundary of the texture chart being placed into the texture atlas and the top boundary of the texture atlas. Other methods build on this approach by sampling multiple orientations of a texture chart and choosing the orientation for placing the texture chart to minimize unused space. Further methods implement sampling placements of a texture chart from four different sides (top, bottom, left, and right) instead of only placing the texture chart from the top. Still further, other methods add a texture chart from all four sides and allow the texture chart to wrap around the atlas boundary. However, each of these methods utilizing Euclidean distance minimization, or straight-line distance, results in unused space within a texture atlas and, accordingly, does not provide optimal packing.

SUMMARY

Embodiments of the present invention are directed towards compactly incorporating texture charts into a texture atlas. Texture charts represent three-dimensional mesh segments flattened into two-dimensional shapes. The more compactly texture charts can be packed into a texture atlas, with a minimal amount of unused space, the higher the texture resolution that can be obtained for a computer graphic when a limited number of available pixels are available for the texture atlas. The number of pixels available can be limited by, for example, the overall resolution of a JPEG storage method for the texture atlas.

To achieve a highly compact packing of a texture atlas, a texture atlas generating engine is used to generate and evaluate compactness scores of candidate placements for a texture chart. Candidate placements generally refer to the possible locations where a texture chart can be incorporated into a texture atlas. A compactness score represents how compactly a texture chart is incorporated into a texture atlas if placed at a candidate placement within the texture atlas. The compactness score can be based on minimizing the distance between a texture chart being incorporated into the texture atlas and the center of mass of previously incorporated texture charts within a texture atlas. As described, an infinity norm can be utilized to compute such a compactness score by outputting an average length of vectors between a texture chart being incorporated into a texture atlas and the texture atlas. In embodiments, texture charts are incorporated into the texture atlas based on such compactness scores.

DETAILED DESCRIPTION

Figure 1:
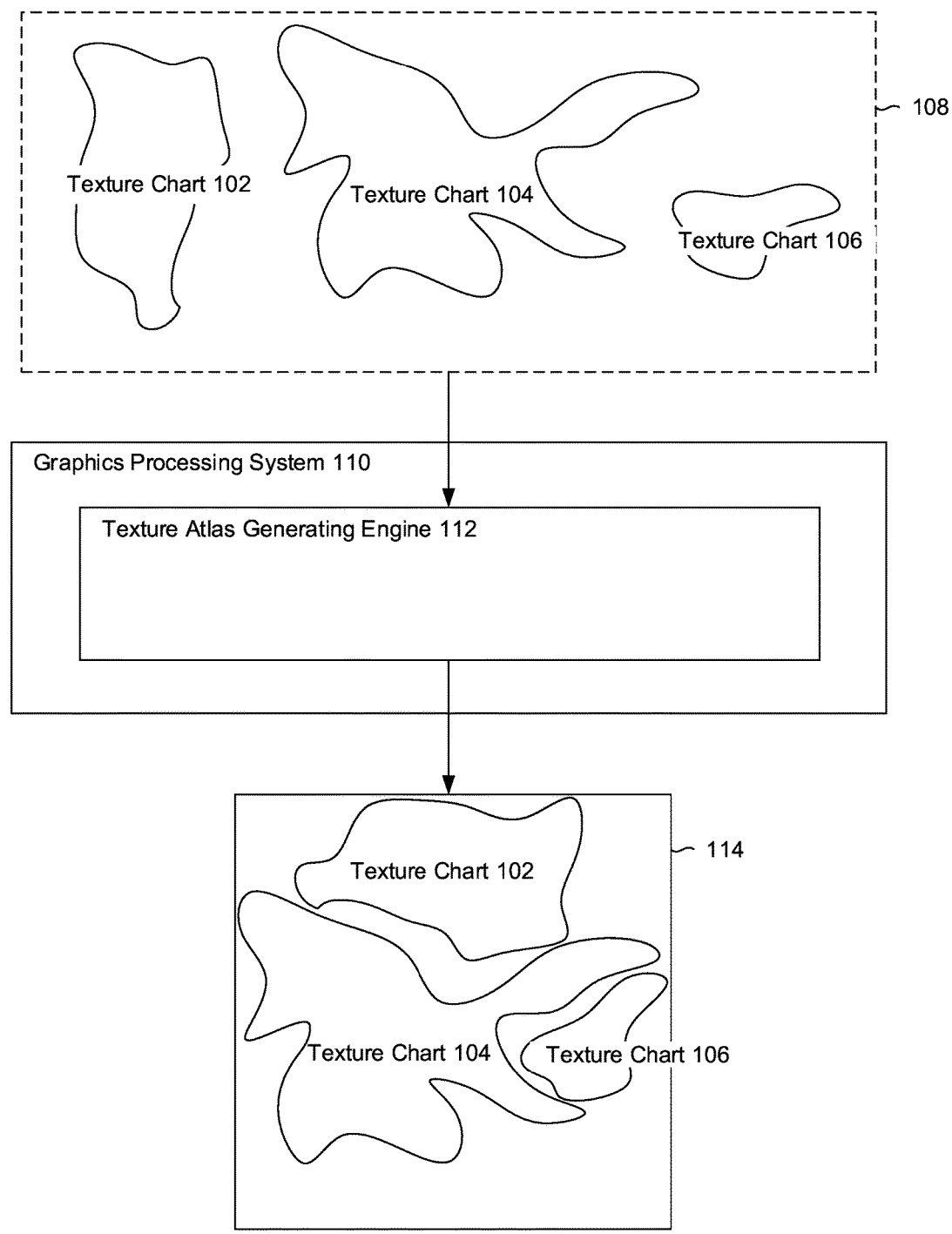
FIG. 1 depicts aspects of an illustrative graphics processing system for implementing a texture atlas generating engine, in accordance with various embodiments of the present disclosure.

One common way to decorate three-dimensional mesh models is using a three-dimensional painting system where a user can paint the surface of the model. Such a system directly writes the painting into two-dimensional images, e.g. texture charts, associated with the three-dimensional mesh model at the proper location. These painted two-dimensional images are then mapped onto the three-dimensional mesh model resulting in a painted three-dimensional mesh model. By placing texture charts into a texture atlas, pixels can be assigned to the texture charts. These pixels are used to assign information during texture mapping. Because a JPEG image often has a fixed number of pixels, the more compactly texture charts are incorporated into a texture atlas, the higher the texture resolution that can be achieved during texture mapping the associated three-dimensional mesh because there is less wasted space taking up the limited number of pixels available.

For example, a three-dimensional mesh depicting a person can be sliced into segments, or segmented, into several three-dimensional mesh segments: one for the face, one for the remaining portion of the head, one for the front of the torso, and one for the arms, back of the torso, and legs. These three-dimensional mesh segments can then be flattened into two-dimensional shapes, known as texture charts. These texture charts can be compactly packed into a texture atlas that can then be used for texture mapping information onto the three-dimensional mesh. The more compactly the texture charts are incorporated into a texture chart, the higher the resolution that can be obtained during texture mapping because more pixels are assigned to the texture charts. A software tool can load a three-dimensional mesh together with its associated texture atlas so that it can look up corresponding textures at particular phases. The more pixels assigned to a texture chart, the more pixels that are available underneath the surface of the three-dimensional mesh that information can be assigned to, resulting in overall higher resolution.

Accordingly, procedures for the compact packing of texture charts into a texture atlas have been implemented in an effort to create higher texture resolution for texturized graphics. In this regard, when texture atlases are not highly compact, the resolution of a graphic can be lower than desired upon completing texture mapping. Currently, texture charts are packed into a texture atlas so that the Euclidean distance between the boundary of a newly incorporated texture chart and the boundary of texture charts previously incorporated in the texture atlas is minimized. However, this criterion alone does not ensure that a texture atlas is highly compact. The current method also does not ensure that a texture atlas will grow in a near-square shape, resulting in additional wasted space when the texture chart is adjusted to conform to the desired square shape used in many texture mapping processes.

As such, embodiments of the present invention are directed towards compactly incorporating texture charts into a texture atlas while growing the texture atlas in a near-square manner. As described, a texture chart refers to a three-dimensional mesh segment flattened into a two-dimensional shape. The smaller a generated texture atlas is with the least amount of unused space, the higher the resolution that can be achieved during texture mapping of the associated three-dimensional mesh. Often such texture charts are stored using JPEG images, which have a fixed level of pixel resolution. As such, any wasted space in a texture atlas results in wasted pixels.

At a high level, in accordance with embodiments of the present invention, texture charts are compactly incorporated into a texture atlas in a sequential basis based on a quality of placement in relation to a center of mass of the texture atlas. In this regard, an initial texture chart can be incorporated in a texture atlas to act as the center of the atlas around which subsequent charts can be incorporated. For instance, using the above example, the texture chart for the arms, back of the torso, and legs can be incorporated into a texture atlas first. Thereafter, another texture chart can be incorporated into the texture atlas in the location providing the most compact packing. For instance, using the above example, the texture chart for the front of the torso can be incorporated next.

To accomplish compact packing when incorporating texture charts into a texture atlas, a texture atlas generating engine can evaluate compactness scores indicating how compactly a texture chart can be incorporated into a texture atlas at a particular candidate placement. Candidate placements refer to the various locations and orientations where a texture chart can be placed when it is incorporated into a texture atlas. A compactness score for a candidate placement can be determined by calculating the minimum distance between the center of mass of previously incorporated texture charts in a texture atlas and a texture chart being incorporated into the texture atlas. In one embodiment, an infinity norm can be used to perform this calculation, outputting an average length of vectors between the texture chart being incorporated into the texture atlas and the previously incorporated texture charts in the texture atlas. Utilizing compactness scores to select the candidate placement for where to place a texture chart into a texture atlas, texture charts can be incorporated into the texture atlas in a highly compact manner.

Utilizing such a compactness score results in packing that grows a texture atlas in a favorable manner—a near-square shape. This is beneficial because squares are often the preferred shape by applications using texture atlases; non-square texture atlases can result in adding unused space when computing a final bounding box to produce a texture atlas with the correct shape. For example, a texture atlas that is packed from bottom to top can result in a long rectangular texture atlas that results in adding additional unused space upon computing a final square bounding box to generate the final square-shaped texture atlas. A texture atlas grown in a near-square shape, on the other hand, results in less wasted space because the shape of the texture atlas only requires slight adjustment upon computing the final square bounding box for the texture atlas. As such, when there are a limited number of pixels available for a texture atlas, such a texture atlas results in a higher number of pixels available for each texture chart incorporated into the texture atlas, allowing for higher resolution during texture mapping of a three-dimensional mesh.

Figure 8:
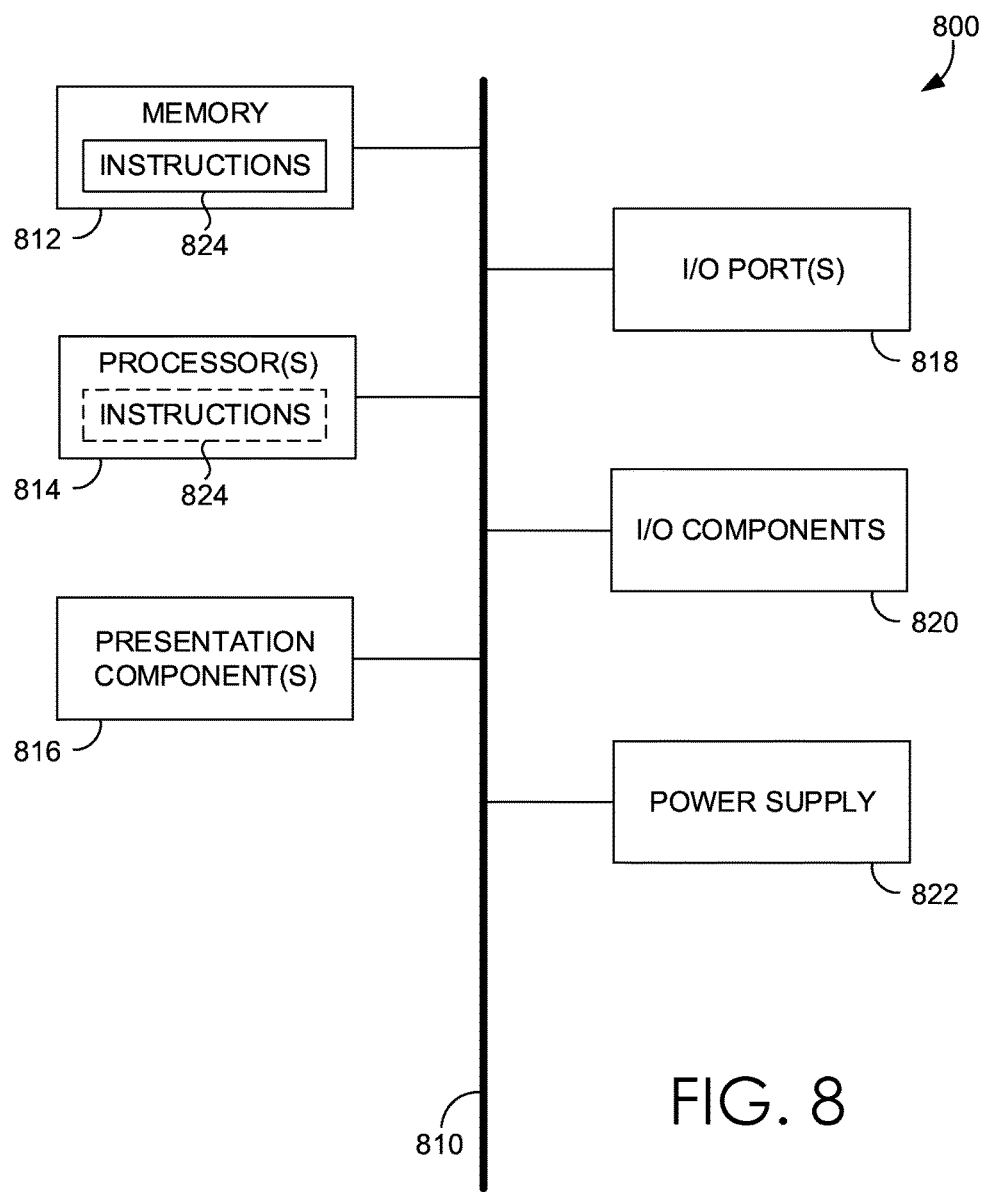
FIG. 8 is a block diagram of an example computing device in which embodiments of the present disclosure may be employed.

FIG. 1 depicts an example configuration of an illustrative graphics processing system 110 for implementing a texture atlas generating engine 112 for compactly incorporating texture charts into a texture atlas, in accordance with various embodiments of the present disclosure. Graphics processing system 110 can be any type of processing system executed by instructions on a computing device. An example of such a computing device with such instructions is depicted in FIG. 8. As depicted, graphics processing system 110 includes a texture atlas generating engine 112.

Texture atlas generating engine 112 receives texture charts 108 to incorporate into a texture atlas. As depicted, texture charts 108 for incorporating into a texture atlas include texture chart 102, texture chart 104, and texture chart 106. It should be appreciated, however, that texture charts to incorporate into a texture atlas can include any number of texture charts. Such texture charts can be received after parameterization of a mesh segment.

After texture atlas generating engine 112 receives texture charts 108 to incorporate into texture atlas 114, the texture atlas generating engine 112 generally generates a texture atlas by incorporating received texture charts into the texture atlas. In particular, and as will be described in more detail with respect to FIG. 2, candidate placements for texture charts 108 are generated to determine possible placements for the texture charts relative to the texture atlas. Candidate placements refer to potential orientations and locations in a texture atlas where a texture chart can be incorporated.

In some embodiments, texture charts to be incorporated into a texture atlas may be analyzed in a particular order or sequence. In this regard, received texture charts 108 can be assigned sorting scores based on predefined criteria. Sorting texture charts allows texture charts to be incorporated into a texture atlas in an order more likely to produce highly compact packing. Predefined criteria may be any type of criteria that is used for sorting or ranking texture charts for analyzing placement of the texture charts in the texture atlas. For example, predefined criteria can be a dimension of a texture chart. A dimension is a measurable aspect of a texture chart. For example, such a dimension can be the longer of height and width of a bounding box encompassing the texture chart. As another example, a dimension can be an area of the texture chart. Upon assigning sorting scores, the texture charts can be sorted utilizing the sorting score based on the predefined criteria. For instance, texture charts 102, 104, and 106 could be sorted in decreasing order based on the longer of height or width of a bounding box encompassing each texture chart resulting in a sorted order of: 104, 102, and 106.

Additionally, to facilitate placement of the texture charts in the texture atlas 114, centers of mass can be determined for the texture charts. A center of mass can be determined, for example, by averaging all pixels comprising a texture chart. Alternatively, a center of mass can be determined by averaging pixels of a perimeter of a texture chart. Such information can be integrated with an output ordered list of texture charts sorted utilizing a sorting score based on predefined criteria. As described in more detail in FIGS. 3 and 5, a center of mass associated with a texture chart can be utilized in generating candidate placements instead of using all points comprising a texture chart. Using a pre-computed center of mass can decrease the computational time required to generate candidate placements for a texture chart by creating a single reference point to compute how compactly a candidate placement incorporates the texture chart into a texture atlas instead of using an average calculated from all points comprising the texture chart. In addition to or in the alternative to pre-computing center of mass, calculating a center of mass for a texture chart being incorporated into a texture atlas can be dynamically performed as part of the candidate placement calculation.

A texture chart can be selected as the first texture chart to incorporate into a texture atlas utilizing predefined criteria. For example, the texture chart with the greatest dimension, where such a dimension can be the longest height or width of the bounding box or the largest area, can be the first texture chart selected and incorporated into the texture atlas. Such a texture chart can be selected utilizing an output ordered list of texture charts sorted by, for example, a dimension. Subsequent texture charts can also be selected for incorporation into a texture atlas utilizing an ordered list of texture charts where the subsequent texture chart selected is the next texture chart with the greatest dimension. Selection and incorporation of texture charts can occur until the received texture charts are incorporated into a texture atlas. For example, after incorporating texture chart 104 into texture atlas 114, 102 can be selected as the subsequent texture chart for incorporation into texture atlas 114. Similarity, after 102 is incorporated into texture atlas 114, 106 can be selected as the subsequent texture chart for incorporation into texture atlas 114.

In embodiments, subsequent texture charts can be incorporated into the texture chart where the first texture chart acts as the center of the texture atlas around which subsequent texture charts are incorporated. For instance, as depicted, texture chart 104 can initially be incorporated into texture atlas 114. When texture charts 102 and 106 are incorporated into texture atlas 114, 104 acts as the center around which texture charts 102 and 106 are incorporated into the texture atlas. It should be appreciated that the center of mass of the first texture chart incorporated into the texture atlas can act as the center of the texture atlas around which subsequent texture charts are added. And, additionally, the center of mass can change to include texture chart being incorporated into the texture atlas.

Candidate placements facilitate the placement of texture charts during incorporation into a texture atlas. For example, candidate placements can be generated by sampling, or simulating, a texture chart to be incorporated in a texture atlas using an orientation of the texture chart at different placements around previously incorporated texture charts in the texture atlas. Candidate placements, in a further embodiment, can be generated by sampling a texture chart to be incorporated utilizing multiple orientations of the texture chart at different placements around previously incorporated texture charts in the texture atlas. As depicted, texture chart 102 and 106 are shown in two different orientations where 102 and 106 in texture chart 114 are the orientations at which the texture charts were incorporated into texture chart 114.

Sampling, or simulating, a texture chart into a texture atlas, can be limited to using one orientation of a texture chart at different placements around previously incorporated texture charts in a texture atlas when the texture chart being incorporated into the texture atlas has a value less than a predetermined threshold value. For instance, when a texture chart has a size less than a predetermined percentage of the texture atlas, such as when a texture chart has a size less than 0.5% of the overall texture atlas, sampling can be limited to utilizing one orientation of the texture chart at different placements around previously incorporated texture charts to generate candidate placements. Such a limitation can increase computational efficiency without having too great of an influence on how compactly texture charts are incorporated into of a texture atlas.

In accordance with generating candidate placements, a compactness scores can be assigned to such candidate placements. Compactness scores can be used to determine which candidate placement of a texture chart will achieve the most compact packing upon incorporation of the texture chart into the texture atlas. A compactness score for a candidate placement can be determined by calculating a minimum distance between the center of mass of previously incorporated texture charts in a texture atlas and the texture chart being incorporated into the texture atlas. Such a compactness score can be calculated for a candidate placement utilizing an infinity norm. The infinity norm can output the average length of vectors between a texture chart simulated at a candidate placement and previously incorporated texture charts in a texture atlas. As depicted, texture chart 102 and 106 are incorporated into texture atlas 114 at the candidate placements that can result in the most compact packing of texture atlas 114

After a texture chart is incorporated into a texture atlas, a center of mass can be calculated for the texture atlas, including the newly incorporated texture chart. For example, a center of mass can be determined by averaging all pixels comprising incorporated texture charts in the texture atlas. A center of mass can also be determined by averaging pixels of a perimeter comprising incorporated texture charts in the texture atlas, where the texture charts are incorporated in an area outside the perimeter. Such a center of mass can be used when generating candidate placements for incorporating a subsequent texture chart.

After incorporating a texture chart into a texture atlas, the location of the newly incorporated texture chart can be stored. For example, the location can be stored as a rasterized version in a data structure. The data structure can be updated when subsequent texture charts are incorporated into a texture atlas. Having such a data structure prevents overlapping texture charts during incorporation into the texture atlas. Additionally, in an embodiment, storing previously incorporated texture charts allows for candidate placements to be generated only outside the parameter of previously incorporated texture charts within the texture atlas.

In an embodiment, upon incorporation of the final received texture chart into the texture atlas, a final bounding square can be computed for the texture atlas. This final bounding square is used to adjust the texture atlas to comport with a predefined size while maintaining an original aspect ratio of the texture atlas. For example, a square is the preferred shape for texture charts in many applications. In computing the final bounding square for a texture atlas, the overall shape should remain square. For instance, texture atlas 114 depicts such a final bounding square reflecting a predefined size.

Figure 2:
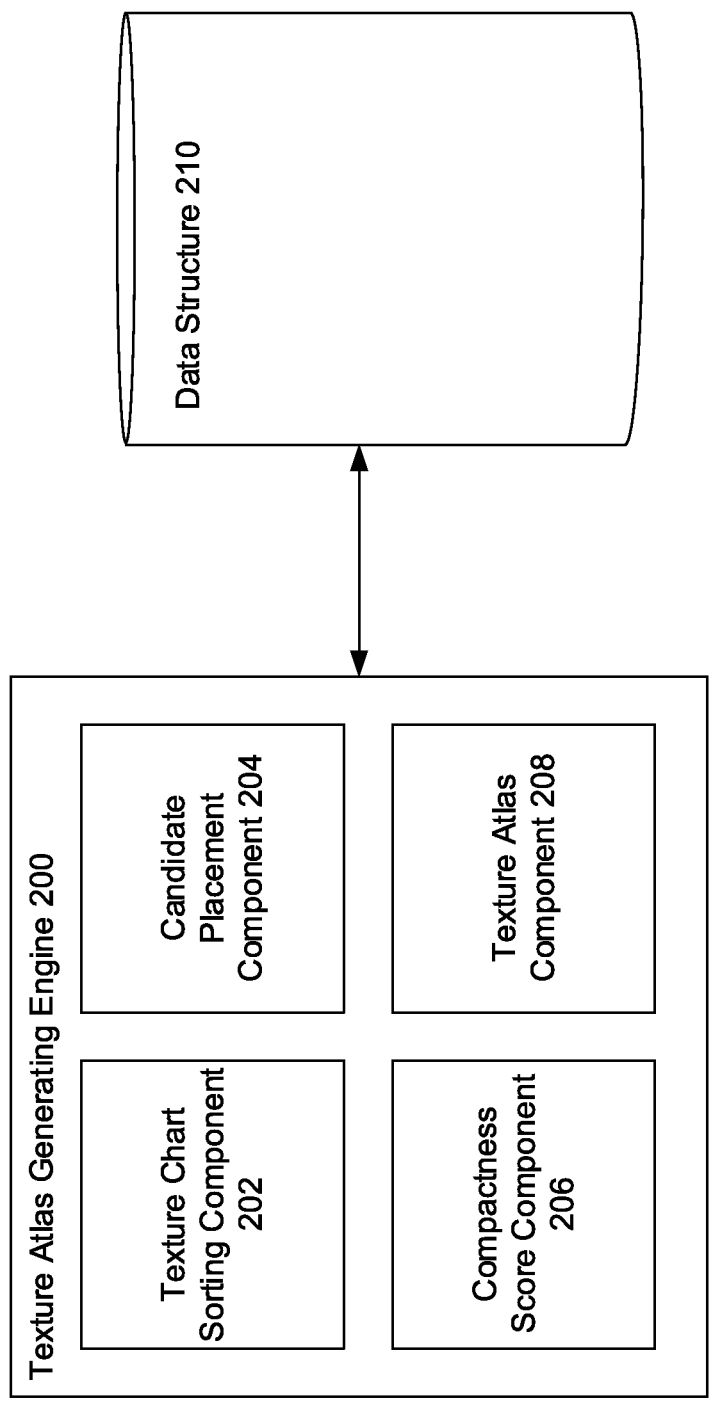
FIG. 2 depicts aspects of an illustrative texture atlas generating engine, in accordance with various embodiments of the present disclosure.

FIG. 2 depicts aspects of an illustrative texture atlas generating engine, in accordance with various embodiments of the present disclosure. Texture atlas generating engine 200 can be any type of software engine run on a processing system executed on a computing device. An example of such a processing system is depicted in FIG. 1. An example of such a computing device is depicted in FIG. 8. Texture atlas generating engine 200, as depicted, includes a texture chart sorting component 202, a candidate placement component 204, a compactness score component 206, and a texture atlas component 208; texture atlas generating engine can also be in communication with a data structure 210. The texture atlas generating engine can be configured to receive texture charts for incorporating into a texture atlas.

Upon texture atlas generating engine receiving texture charts to incorporate into a texture chart, texture chart sorting component 202 can sort the received texture charts. Texture chart sorting component can sort the received texture charts by assigning a sorting score to the texture charts based on predefined criteria. In embodiments, the predefined criteria can be a dimension of a texture chart. A dimension is some measurable aspect of a texture chart. For example, the dimension can be the greater of height and width of a bounding box encompassing the texture chart. A bounding box can be constructed so that the box is the minimum enclosing box for a texture chart where the box is the smallest measure within which all points of the texture chart lie. After a bounding box is constructed for a texture chart, the longer dimension of the bounding box can be determined, whether height or width. Alternatively, the dimension can be the area of the texture chart. Dimensions can be used to sort the received texture charts. Texture chart sorting component 202 can output an ordered list where the ordering is based on the predefined criteria. Ordering can occur, for example, in descending order so that the texture chart with the greatest dimension is first on the list and the texture chart with the smallest dimension is last on the list. Such ordering is only one method that can be used by texture chart sorting component to sort the received texture charts.

In a further embodiment, texture chart sorting component can calculate a center of mass for the received texture charts. A center of mass can be determined by averaging all pixels comprising a texture chart. Alternatively, a center of mass can be determined by averaging pixels of a perimeter of a texture chart. Such information can be integrated with an output ordered list of texture charts and stored in data structure 210. A center of mass of a texture chart can be utilized in generating candidate placements for incorporating the texture chart into a texture atlas. Utilizing a pre-computed center of mass of a texture chart can decrease the computational time required to generate candidate placements. It should be appreciated, however, that the center of mass of a texture chart does not need to be pre-computed, and a center of mass can be calculated during the candidate placement generation process for an individual texture chart.

Candidate placement component 204 generates candidate placements for a selected texture chart from the received texture charts. Candidate placements are potential placements of a texture chart into a texture atlas. Candidate placements can be generated by candidate placement component 204 sampling a selected texture chart at different placements around previously incorporated texture chart in a texture atlas. Placements can include one or multiple orientations of the texture chart at different locations around previously incorporated texture charts.

As such, candidate placement component 204 selects a first texture chart for placement into a texture atlas. Selection of a first texture chart can be done using predefined criteria. For example, the texture chart with maximum dimension. It should be appreciated that subsequent texture charts can also be selected for incorporation into the texture atlas utilizing the same predefined criteria. In an embodiment, the candidate placement component 204 utilizes the ordered list of received texture charts as generated by texture chart sorting component 202 to select the first texture chart to incorporate into the texture atlas.

Sampled placements can be limited to one orientation based on a predetermined threshold value. Such a limitation can increase computational efficiency without greatly influencing the packing efficiency of the texture charts into a texture atlas. A threshold value can be determined, for example, by the size of a selected chart in relation to the overall texture atlas. A threshold value can also be determined based on the difference between the height and width of a texture chart. Alternatively, a threshold value can be determined based on the amount of empty space in a bounding circle around a texture chart. When a value is less than the predetermined threshold value, sampled placements are limited to one orientation.

Once candidate placements are generated by candidate placement component 204, compactness score component 206 can calculate compactness scores for the generated candidate placements. A compactness score indicates how compactly a texture chart can be incorporated into a texture atlas at a candidate placement. Compactness scores can be used to compare candidate placements of a texture chart to determine which candidate placement achieves the most compact packing upon incorporation of the texture chart into a texture atlas. A compactness score can be determined by calculating the minimum distance between the center of mass of previously packed texture charts in a texture atlas and a texture chart being incorporated into the texture atlas. Such a compactness score can be calculated for a candidate placement using an infinity norm. The infinity norm can output the average length of vectors between a texture chart simulated in a candidate placement and previously incorporated texture charts in a texture atlas.

In an embodiment, the infinity norm outputs the average length of vectors between at least one pixel of the texture chart in the candidate placement and the center of mass of the previously incorporated texture charts. The pixel(s) of the texture chart can include all pixels that form the selected texture chart. Alternatively, the pixel(s) can include the pixels that form an outline of the selected texture chart. As another example, the pixel(s) can also be the pixel of the selected texture chart determined to be at the center of mass of the selected texture chart.

Those skilled in the art will appreciate that Equation 1 can be utilized as an infinity norm to output a calculated compactness score.

$$d(p_x, p_y) = \frac{\sum_{i=1}^{n} D(p_i, (c_x, c_y))}{n} \quad \text{(Equation 1)}$$

$D(p_i,(c_x,c_y))$ denotes the distance from a pixel i to $(c_x, c_y)$, the current center of mass of the previously incorporated texture charts in the texture atlas. This distance can be computed as max $(d^i_x, d^i_y)$, the maximum of the vertical and horizontal distance from the pixel i to the center of mass. $d(p_x, p_y)$ denotes the average of such distances computed over the at least one pixel of the texture chart and provides a compactness score for the candidate placement. In this embodiment, a smaller value of $d(p_x, p_y)$, indicates a more compact packing at a candidate placement. Those skilled in the art will appreciate that Equation 1 is only one equation that can be utilized as an infinity norm to output a calculated compactness score.

In further embodiments, when two or more candidate placements have equal compactness scores, a Euclidean distance can be utilized to determine which candidate placement can result in more compact packing. For example, in such a scenario, a first Euclidean distance can be calculated between a texture chart simulated at a candidate placement and the texture atlas and a second Euclidean distance can be calculated for the texture chart simulated at another candidate placement and the texture atlas. The calculated Euclidean distance can then be utilized to select the candidate placement that results in more compact packing between candidate placements with equal compactness scores. For example, the candidate placement with the smaller Euclidean distance can result in more compact packing.

In an embodiment, a compactness score can be output utilizing an infinity norm incorporating Euclidean distance.

Those skilled in the art will appreciate that Equation 2 can be utilized as an infinity norm incorporating Euclidean distance to output a calculated compactness score.

$$d(p_x, p_y) = \frac{\sum_{i=1}^{n} D(p_i, (c_x, c_y)) + \lambda \sum_{i=1}^{n} D_2(p_i, (c_x, c_y))}{n} \quad \text{(Equation 2)}$$

Such incorporation can occur by adding the term $D_2(p_i, (c_x,c_y))$ which is computed as min $(d^i_x, d^i_y)$, minimum of the vertical and horizontal distance from a pixel to the center of mass of a texture atlas. This term is weighed by a small factor $\lambda$ where $\lambda=1e-3$. Thus, utilizing Equation 2 among candidate placements with the same maximum distance to the center of mass of previously incorporated texture charts in the texture atlas, the candidate placement with the smaller Euclidean distance may be preferred. While Equation 2 incorporates a weighted Euclidean distance and a calculation for the average length of vectors between at least one pixel of a selected texture chart and a center of mass for previously incorporated texture charts in a texture atlas into one equation, it should be appreciated that in some embodiments, these calculations can be performed separately.

Compactness scores calculated for candidate placements can be used to select the candidate placement that can result in the most compact packing of the texture chart upon incorporation into the texture atlas. For example, if Equation 1 or Equation 2 is used to output a compactness score, the lower the score, the more compactly the texture chart is incorporated into the texture atlas. Upon selecting a candidate placement utilizing compactness scores, a texture chart can be incorporated into a texture atlas at that placement.

Texture atlas component 208 can be used to select which candidate placement to utilize for incorporating a texture chart into a texture atlas based on the calculated compactness scores for the candidate placements. The texture atlas component 208 can select the candidate placement that provides the most compact packing of a texture chart when incorporating the texture chart into a texture atlas. For example, if Equation 1 or Equation 2 is used to output compactness scores, the lower the output score, the more compactly the texture chart is incorporated into the texture atlas. Upon selecting a candidate placement utilizing compactness scores, the texture atlas component 208 can incorporate the texture chart at the selected candidate placement into the texture atlas. After texture atlas component 208 incorporates a texture chart into a texture atlas, the texture atlas component can calculate a center of mass for the texture atlas where the texture atlas includes previously incorporated texture charts and the newly incorporated texture chart. A center of mass can be determined by averaging the pixels comprising the texture charts incorporated into the texture atlas. A center of mass can also be determined by averaging pixels of a perimeter comprising the texture charts incorporated into the texture atlas.

In further embodiments, texture atlas component 208 can store the location of a newly incorporated texture chart. The location of incorporated texture charts can be stored as a rasterized version in data structure 210. To reduce memory requirements and improve performance, the data structure can store information as a bit array. Such a bit array can be a bit field for the pixels in the texture atlas where the value of a bit is set to 1 or 0, respectively, depending on whether a pixel is occupied by a texture chart or not occupied by a texture chart. These bits can be stored as arrays of unsigned integers where each integer is a size of 32 or 64 depending on the system. Such a data structure can reduce memory requirements allowing performance operations such as setting a bit and reading a bit using bit operations. Bit operations can include bit shift, bitwise and, and bitwise or which.

Data structure 210 can be updated by texture atlas component 208 when a texture chart is incorporated into a texture atlas. Having such a data structure prevents overlapping texture charts during incorporation into a texture atlas. As such, storing of the placements of texture charts incorporated into a texture atlas allows for candidate placements to be generated only outside the parameter of the texture charts previously incorporated into the texture atlas.

Texture atlas component 208 can also compute a final bounding square for a texture atlas. A bounding square can be computed once the final received texture charts has been incorporated into a texture atlas. This final bounding square is utilized to adjust the texture atlas to comport with a predefined size while maintaining an original aspect ratio of the texture atlas. Such predefined size can be related to JPEG image requirements.

Figure 3:
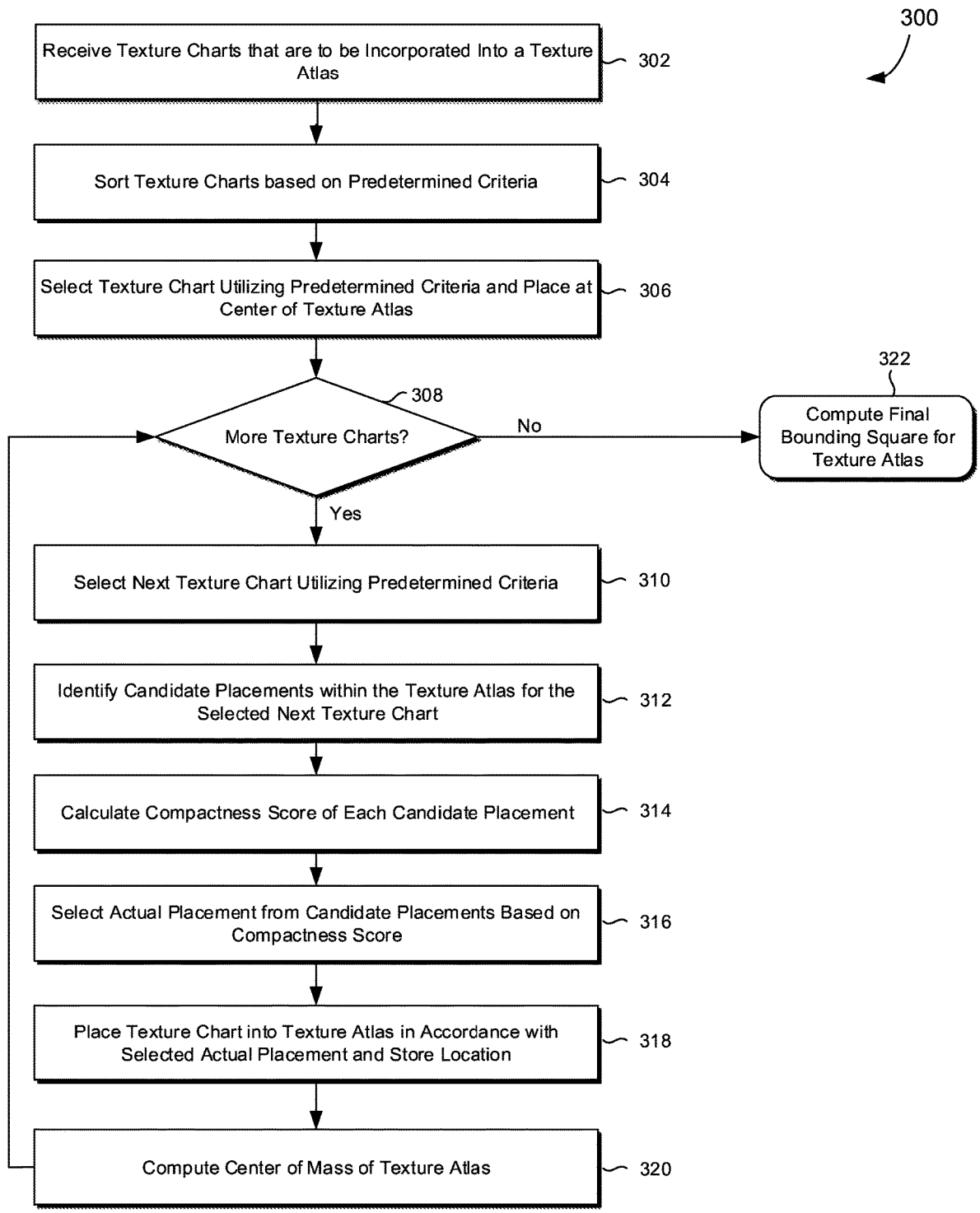
FIG. 3 illustrates a process flow depicting an example packing of received texture charts into a texture atlas, in accordance with various embodiments of the present disclosure.

FIG. 3 illustrates a process flow 300 depicting an example incorporation of received texture charts into a texture atlas, in accordance with various embodiments of the present disclosure. Process flow 300 can be carried out, for example by a texture atlas generating engine as discussed with reference to FIGS. 1 and 2.

As depicted, process flow 300 begins at block 302 where texture charts are received to incorporate into a texture atlas. A texture chart is a representation of a three-dimensional mesh segment flattened into a two-dimensional shape. Any number of texture charts can be received for packing into a texture chart.

At block 304, the received texture charts can be sorted based on predetermined criteria. Such predetermined criteria can be, for example, a dimension of a texture chart. A dimension is a measurable aspect of some kind of the texture chart. The received texture charts can be output into a sorted list using the predetermined criteria.

A first texture chart is selected and incorporated into a texture atlas at block 306. The texture chart can be selected using predefined criteria such as a dimension. For example, the selected texture chart can be the texture chart with the largest dimension of the texture charts received for incorporation into a texture atlas. After selection, this first texture chart can be incorporated into the texture atlas.

After incorporating the first texture chart into a texture atlas, the process then moves to block 308 where a determination is made as to whether there are more texture charts to incorporate into the texture atlas. If the result of the determination at block 308 is in the affirmative, then processing moves onto block 310. If the result of the determination at block 308 is in the negative then processing moves onto block 322, discussed in more detail below.

At block 310, a subsequent texture chart is selected for incorporation into a texture atlas. Such a texture chart can be selected using predefined criteria. For example, the selected texture chart can be the texture chart with the largest dimension of the remaining texture charts received that have yet to be incorporated into the texture atlas. This selected texture chart can be incorporated into the texture atlas using candidate placements.

At block 312, candidate placements for the selected texture chart are identified. Candidate placements can be generated by sampling a selected texture chart at an orientation of the texture chart at different locations around previously incorporated texture charts in a texture atlas. Candidate placements can also be generated by sampling a texture chart at multiple orientations of the texture chart at different placements around previously incorporated texture charts in the texture atlas.

Compactness scores can be calculated at block 314 for identified candidate placements. Such a compactness score can be used to determine which candidate placement will achieve the most compact packing upon incorporation of a texture chart into the texture atlas. Those skilled in the art will appreciate that Equation 1 or 2 as discussed with reference to FIG. 2 can be utilized as an infinity norm to output a calculated compactness score.

An actual placement for a texture chart can be selected at block 316 based on calculated compactness scores for candidate placements. For example, if Equation 1 or Equation 2 is used to output compactness scores, the lower the score, the more compactly the texture chart is incorporated into the texture atlas. As such, for the most compact packing of a texture chart, the candidate placement with the lowest compactness score can be selected as the actual placement for a texture chart.

At block 318, the texture chart can be incorporated into the texture atlas in accordance with the selected actual placement and the location can be stored. For example, the location can be stored as a rasterized version in a data structure. The data structure can be updated when a subsequent texture chart is incorporated into a texture atlas. Having such a data structure prevents overlapping texture charts during incorporation into the texture atlas by allowing candidate placements to be generated only outside the parameter of previously incorporated texture charts within the texture atlas.

After incorporating the texture chart into the texture atlas, a new center of mass of the texture atlas can be computed at block 320. For example, a center of mass can be determined by averaging all pixels comprising previously incorporated texture charts in the texture atlas. A center of mass can also be determined by averaging pixels of a perimeter comprising previously incorporated texture charts in the texture atlas, where the texture charts are incorporated in an area outside the perimeter. Such a center of mass can be used when incorporating subsequent texture charts into the texture atlas.

After computing a new center of mass of the texture atlas, the process can move back to block 308 where a determination is made as to whether there are more texture charts to incorporate into the texture atlas. If the result of the determination is in the affirmative, then the process proceeds through blocks 310-320 as described above. If the result is in the negative, then the process proceeds to block 322. At block 322, a final bounding square is computed for the texture atlas. This final bounding square is utilized to adjust the texture atlas to comport with a predefined size while maintaining an original aspect ratio of the texture atlas.

Figure 4:
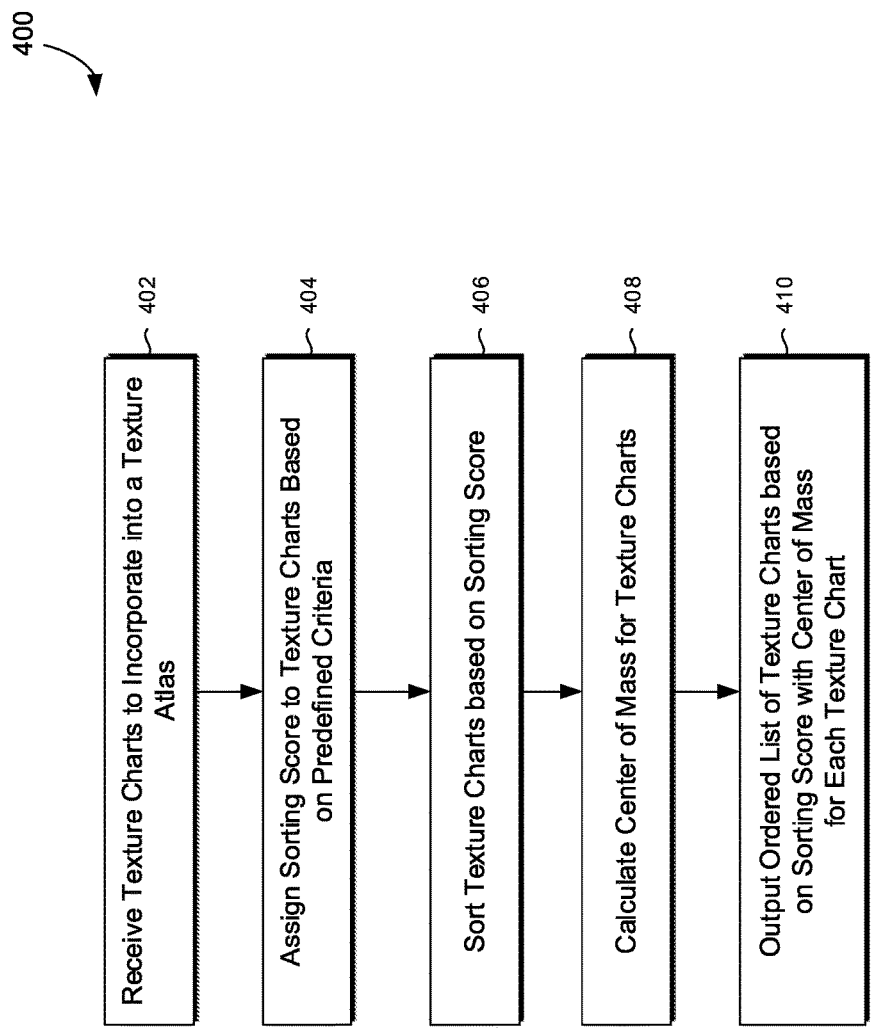
FIG. 4 illustrates a process flow depicting an example sorting of received texture charts for incorporating into a texture atlas, in accordance with various embodiments of the present disclosure.

FIG. 4 illustrates a process flow 400 depicting an example sorting of received texture charts to incorporate into a texture atlas, in accordance with various embodiments of the present disclosure. Such sorting can take place using a texture chart sorting component on a texture atlas generating engine as described with reference to FIG. 2.

At block 402, a texture atlas generating engine (e.g. texture atlas generating engine 200) can receive texture charts to incorporate into a texture atlas. Received texture charts can be assigned a sorting score based on predefined criteria at block 404. For example, the predefined criteria can be a dimension of the texture atlases. A dimension is a measurable aspect of some kind of the texture chart. For example, such a dimension can be the longer of height and width of a bounding box encompassing the texture chart. Alternatively, the dimension can be an area of the texture chart. After the received texture charts are assigned sorting scores, the texture charts can be sorted at block 406 utilizing the sorting score based on the predefined criteria.

A center of mass can be calculated at block 408 for the received texture charts for incorporating into a texture atlas. Utilizing a pre-computed center of mass can decrease the computational time required to generate such candidate placements. It should be appreciated that a center of mass for a texture chart being incorporated into a texture atlas can also be calculated as part of the candidate placement identification and selection process. Additionally, in further embodiments, the center of mass of texture charts does not need to be utilized for incorporating a texture chart into a texture atlas.

At block 410, the sorted texture charts can be output in an ordered list where the ordering is based on predefined criteria. Information such as the center of mass of a texture chart can be integrated with such an output ordered list of texture charts. In embodiments, this ordered list can be stored in a data structure (e.g. data structure as described with reference to FIG. 2).

Figure 5:
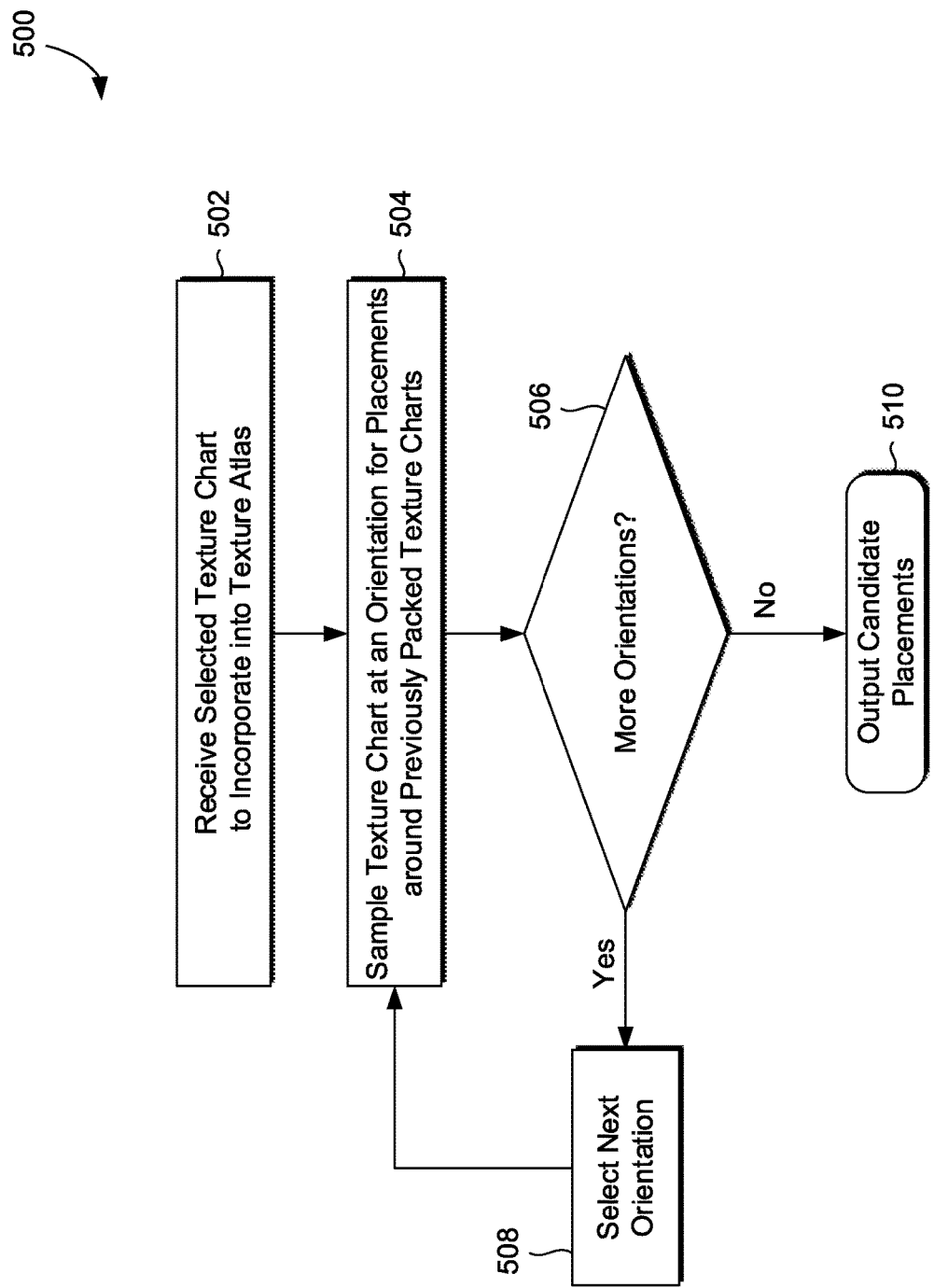
FIG. 5 illustrates a process flow depicting an example generating of candidate placements for incorporating a texture chart into a texture atlas, in accordance with various embodiments of the present disclosure.

FIG. 5 illustrates a process flow 500 depicting an example generating of candidate placements for incorporating a texture chart into a texture atlas, in accordance with various embodiments of the present disclosure. To determine where to place a texture chart when incorporating it into the texture atlas, candidate placements can be generated. Such generating can take place using a candidate placement component on a texture atlas generating engine as described with reference to FIG. 2.

At block 502 a selected texture chart to be incorporated into the texture atlas can be received. Such a texture chart can be selecting using the process described with reference to FIG. 4. To generate candidate placements, the selected texture chart can be sampled, or simulated, in a texture atlas at block 504 utilizing an orientation of the texture chart at different locations around previously incorporated texture charts in the texture atlas.

At block 506 a determination can be made as to whether more additional orientations of the texture chart should be sampled to generate additional candidate placements. Such a limitation can increase computational efficiency without having much of an influence on packing efficiency of a texture atlas. This determination can be made, for example, by limiting sampling to utilizing one orientation of a texture chart at different placements around previously incorporated texture charts in a texture atlas based on whether a texture chart meets a predetermined threshold value. A value can be determined, for example, using the size of a selected chart in relation to the overall texture atlas. When the selected texture atlas has a size less than a predetermined percentage of the overall texture atlas, sampling can be limited to one orientation.

If the result of the determination at block 506 is in the affirmative, then processing continues to block 508 where a next orientation is selected. Then processing returns to block 504 where the process of sampling the texture chart at the new orientation at placements around the previously packed texture charts is repeated. This process can be repeated for any number of orientations. If the result of the determination at block 506 is in the negative, then processing continues to block 510. At block 510, identified candidate placements are output.

Figure 6:
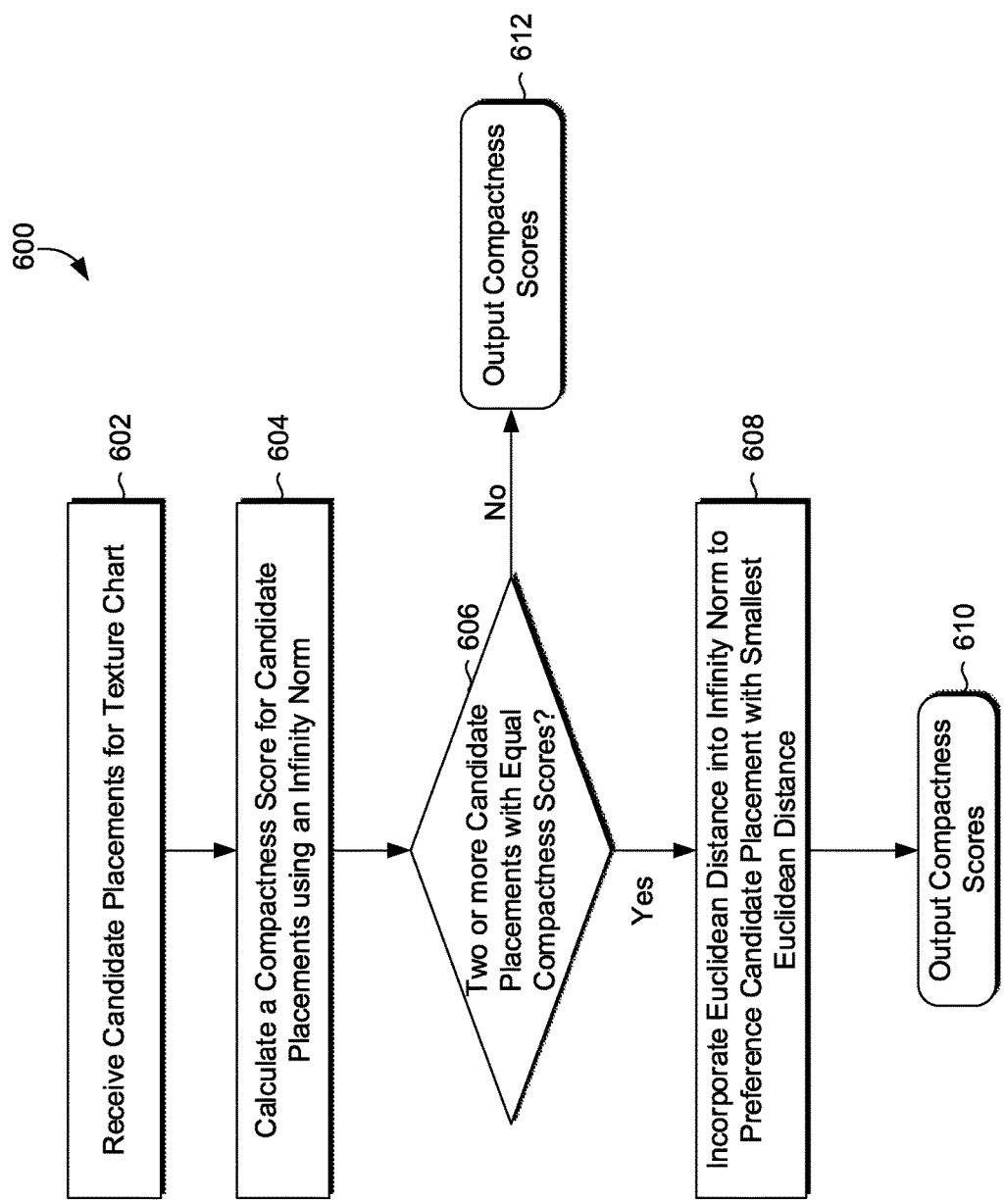
FIG. 6 illustrates a process flow depicting an example generating of compactness scores for candidate placements of a texture chart for incorporating into a texture atlas, in accordance with various embodiments of the present disclosure.

FIG. 6 illustrates a process flow 600 depicting an example generating of compactness scores for candidate placements of a texture chart for incorporating into a texture atlas, in accordance with various embodiments of the present disclosure. To determine which candidate placement for a texture chart results in the most compact packing of a texture chart upon incorporation into a texture atlas, compactness scores can be generated. A compactness score is associated with a particular candidate placement of a texture chart. The compactness score indicates how compactly a texture chart can be incorporated into a texture chart if placed in a candidate placement. Such scores can be calculated using a compactness score component on a texture atlas generating engine as described with reference to FIG. 2.

At block 602, candidate placements for a texture chart can be received. Candidate placements can be identified using the process described with reference to FIG. 5. Compactness scores for such received candidate placements can be calculated at block 604 using an infinity norm. An infinity norm can output the average length of vectors between a texture chart simulated at a candidate placement and previously incorporated texture charts in a texture atlas. For example, the infinity norm outputs the average length of vectors between at least one pixel of the texture chart at the candidate placement and the center of mass of the previously places texture charts. In one embodiment, the at least one pixel of the texture chart can include all pixels that form the selected texture chart. The at least one pixel of the texture chart can also include all pixels that form an outline of the selected texture chart. Alternatively, the at least one pixel of the texture chart can be the pixel of the selected texture chart determined to be at the center of mass of the selected texture chart. Those skilled in the art will appreciate that Equation 1 as discussed with reference to FIG. 2 can be utilized as such an infinity norm to output a calculated compactness score.

At block 606, a determination can be made as to whether two or more of the calculated compactness scores are equal. If the determination is in the affirmative, processing continues to block 608 where a Euclidean distance can be incorporated into an infinity norm to preference the candidate placement with the smallest Euclidean distance. For example, in such a scenario, a first Euclidean distance can be calculated between a candidate placement and the texture atlas and a second Euclidean distance can be calculated of another candidate placement and the texture atlas. The calculated Euclidean distance can then be utilized to select the candidate placement that results in more compact packing between candidate placements with equal compactness scores. For example, the candidate placement with the smaller Euclidean distance can result in more compact packing. Those skilled in the art will appreciate that Equation 2 as discussed with reference to FIG. 2 can be utilized as an infinity norm incorporating a Euclidean distance to output a calculated compactness score.

At block 610, compactness scores can be output for the received candidate placements. Similarly, when the determination at block 606 is in the negative, processing continues to block 612 where compactness scores are output for the received candidate placements.

Figure 7:
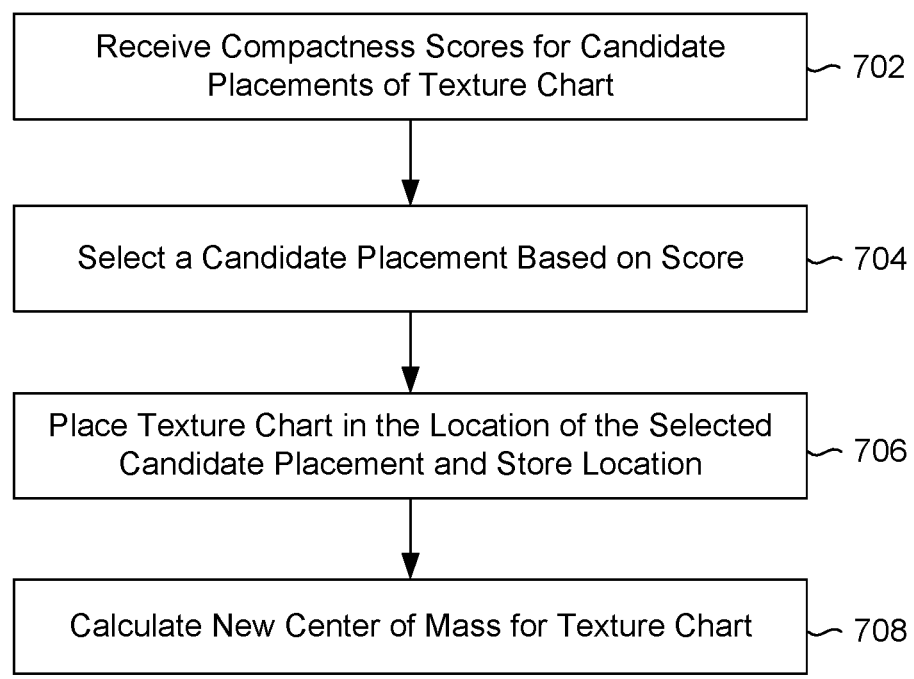
FIG. 7 illustrates a process flow depicting an example placing of a texture chart into a texture atlas utilizing calculated compactness scores, in accordance with various embodiments of the present disclosure.

FIG. 7 illustrates a process flow depicting an example incorporation of a texture chart into a texture atlas utilizing calculated compactness scores, in accordance with various embodiments of the present disclosure. Calculated compactness scores can be used to incorporate a texture chart into a texture atlas at the candidate placement that results in the most compact packing of the texture atlas. Such selection and placement can occur using a texture atlas component on a texture atlas generating engine as described with reference to FIG. 2.

At block 702, compactness scores for the candidate placements of a texture chart are received. Such compactness scores can be calculated using the process described with reference to FIG. 6. The candidate placement that will most compactly pack the texture chart into the texture atlas can be selected at block 704 by using the calculated compactness scores. For example, if Equation 1 or Equation 2 is used to output compactness scores, the lower the outputted score, the more compactly the texture chart can be incorporated into the texture atlas.

Upon selecting a candidate placement based on calculated compactness scores, the texture atlas component can incorporate the texture chart at that candidate placement into the texture atlas at block 706. Once a texture chart is incorporated into a texture atlas, the location of the texture chart can also be stored. The location of the incorporated texture charts can be stored, for example, as a rasterized version in a data structure. Such a data structure can be updated when a new texture chart is incorporated into a texture atlas. Having data structure store the locations of incorporated texture charts prevents overlapping subsequently placed texture charts during incorporation into a texture atlas.

Additionally, at block 708, after a texture chart is incorporated into a texture atlas, a center of mass for the texture atlas, including the newly incorporated texture chart, can be calculated. A center of mass can be determined by averaging the pixels comprising the texture charts incorporated into the texture atlas. A center of mass can also be determined by averaging pixels of a perimeter comprising the texture charts incorporated into the texture atlas.

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for generating a texture atlas, comprising:
   selecting a texture chart for placement into a texture atlas, the texture chart representing a three-dimensional mesh segment flattened into a two-dimensional shape;
   determining a location to place the texture chart with respect to an incorporated texture chart in the texture atlas based on a minimal distance between the texture chart and a center of mass of the incorporated texture chart in the texture atlas; and
   storing the determined location for the texture chart in relation to the texture atlas.

2. The computer-implemented method of claim 1, the method further comprising:
   determining the distance between the texture chart and the center of mass of the incorporated texture charts in the texture atlas using an infinity norm configured to output an average length of vectors between at least one pixel of the texture chart and the center of mass of the incorporated texture charts in the texture atlas.

3. The computer-implemented method of claim 2, wherein the at least one pixel of the texture chart includes all pixels that comprise the texture chart.

4. The computer-implemented method of claim 2, wherein the at least one pixel of the texture chart is a pixel determined to be at a center of mass of the selected texture chart.

5. The computer-implemented method of claim 1, wherein determining the location includes identifying candidate placements that are outside a perimeter of the incorporated texture charts in the texture atlas.

6. The computer-implemented method of claim 5, wherein determining the location further comprises:
   determining a set of compactness scores corresponding with the candidate placements, a compactness score based on a distance between a candidate placement and the center of mass of the incorporated texture charts in the texture atlas, wherein determining the location to place the texture chart is based on the compactness scores.

7. The computer-implemented method of claim 5, wherein identifying the candidate placements includes rotating the texture chart to different orientations around the incorporated texture charts in the texture atlas.

8. The computer-implemented method of claim 5, wherein identifying the candidate placements includes utilizing placements at one orientation around the incorporated texture charts in the texture atlas when the texture chart has a value less than a predetermined threshold value.

9. One or more non-transitory computer-readable storage media having instructions stored thereon, which, when executed by one or more processors of a computing device, cause the computing device to:
   determine compactness scores for candidate placements of a texture chart within a texture atlas;
   select a candidate placement from the candidate placements based on the compactness scores, the candidate placement selected based on a compactness score that indicates a minimal distance between the texture chart and a center of mass of the texture atlas; and
   store the texture chart in relation to the texture atlas at the selected candidate placement.

10. The one or more non-transitory computer-readable storage media of claim 9, wherein instructions further cause the computing device to:

store a location of a first incorporated texture chart in a data structure; and utilize the data structure in incorporating the texture chart to place the texture chart in a location different from the first incorporated texture chart.

11. The one or more non-transitory computer-readable storage media of claim 9, wherein instructions further cause the computing device to:

determine a final bounding square for the texture atlas; and adjust the texture atlas to comport with a predefined size while maintaining an original aspect ratio of the texture atlas prior to the adjustment.

12. The one or more non-transitory computer-readable storage media of claim 9, wherein determining the compactness scores further comprises:

determining that the compactness score of the selected candidate placement and another compactness score of another candidate placement are equal; and in response to the determining, obtaining a first Euclidean distance between the selected candidate placement and a selected point of the texture atlas and a second Euclidean distance between the another candidate placement and the selected point of the texture atlas, wherein selecting the candidate placement is further based on the first Euclidean distance and the second Euclidean distance.

13. The one or more non-transitory computer-readable storage media of claim 9, wherein the compactness scores are determined using an infinity norm configured to output an average length of vectors between at least one point on the texture chart and a selected point of the texture atlas.

14. The one or more non-transitory computer-readable storage media of claim 13, wherein the at least one point on the texture chart is a center of mass of the texture chart, the center of mass of the texture chart determined by averaging all pixels comprising the texture chart.

15. The one or more non-transitory computer-readable storage media of claim 13, wherein the center of mass of the texture chart is determined by averaging perimeter pixels of the texture chart.

16. The one or more non-transitory computer-readable storage media of claim 9, wherein instructions further cause the computing device to:

place subsequently selected texture charts into the texture atlas using determined compactness scores for each of the subsequently selected texture charts until each of the subsequently selected texture charts is incorporated in the texture atlas.

17. The one or more non-transitory computer-readable storage media of claim 16, wherein instructions further cause the computing device to:

select a second texture chart from the subsequently selected texture charts for placement into the texture atlas based on predefined criteria.

18. The one or more non-transitory computer-readable storage media of claim 17, wherein the predefined criteria indicates a dimension of the subsequently selected texture charts.

19. A computing system comprising:

means for selecting a texture chart for placement into a texture atlas;

means for determining a location to compactly place the texture chart in the texture atlas based on a minimal distance between the texture chart and a center of mass of the texture atlas; and means for placing the texture chart at the determined location within the texture atlas.

20. The computing system of claim 19, further comprising:

means for computing a final bounding square for the texture atlas; and means for adjusting the texture chart to comport with a predefined size while maintaining an original aspect ratio of the texture atlas prior to the adjustment.

* * * * *